Feb. 7, 1961 E. S. LESLIE 2,971,064

AUTOMATIC ADJUSTABLE FILM SUPPORT FOR MAGNETIC RECORDER

Filed May 31, 1955

INVENTOR.
Edward S. Leslie
BY [signature]
ATTORNEY.

2,971,064
Patented Feb. 7, 1961

2,971,064

AUTOMATIC ADJUSTABLE FILM SUPPORT FOR MAGNETIC RECORDER

Edward S. Leslie, Van Nuys, Calif., assignor to Radio Corporation of America, a corporation of Delaware Filed May 31, 1955, Ser. No. 512,035

6 Claims. (Cl. 79—100.2)

This invention relates to sound recording and reproducing apparatus, and particularly to magnetic sound recording and reproducing using magnetic mediums, such as film or tape.

There are several types of magnetic film or tape mediums on which sound is recorded. These mediums may have a base over one entire surface of which is adhered finely divided iron oxide particles. These mediums may be of different widths with and without sprocket holes or perforations. Other types of magnetic mediums utilize a base such as a standard photographic motion picture and sound film and on which are one or more magnetic stripes, one of which is positioned in the usual photographic sound area of the film. Some single striped sound films use a narrow stripe at the opposite edge of the film from the regular sound track stripe so that the film will wind uniformly on the reels. The latter form of striped film is in extensive use, particularly for original recording and rerecording in the production of motion pictures.

In the use of magnetic film made up of finely divided particles, the surface of the layer of particles is in direct contact with the pole pieces of the magnetic heads, and the abrasive effect of the moving film wears the pole pieces. This wear causes a position variation between the film and pole piece surfaces which results in a loss of uniform contact between the surface of the magnetic stripe and the gap and pole pieces of the head. Although a head can tolerate a certain amount of wear, it is necessary that the surface of the magnetic material be maintained in uniform contact with the surfaces of the pole pieces of the head at all times. The present invention accomplishes this adjustment automatically and does so by providing a resilient support for a portion of the film which varies in position with the portion of the film at the magnetic head.

The principal object of the invention, therefore, is to facilitate the magnetic recording and reproduction of sound.

Another object of the invention is to provide an improved system for automatically adjusting the position of a film surface as it varies with the wear of a magnetic head.

A further object of the invention is to provide an improved support for a magnetic film to maintain the proper uniform contact relationship between the sound track portion of the film and the magnetic head as the head is worn by the film passing thereover.

The novel features which are believed to be characteristic of this invention, both as to the manner of its organization and the mode of its operation, will be better understood from the following description, when read in conjunction with the accompanying drawings, in which.

Figure 1:
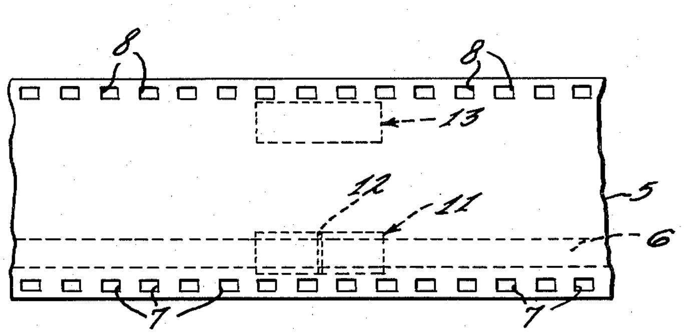
Fig. 1 is a plan view showing the relationship between a magnetic film, a magnetic head, and an automatically adjustable support embodying the invention.

Referring now to the drawings, a magnetic film 5 has a magnetic sound track stripe 6 thereon, the film 5 having sprocket holes or perforations 7 and 8. The invention is also applicable to film without sprocket holes. Under the film, and shown in dotted lines, is a magnetic head 11 with its gap 12 and an automatically adjustable support 13, the film 5 being pulled over the head 11 and support 13 as shown in the drawings.

Figure 2:
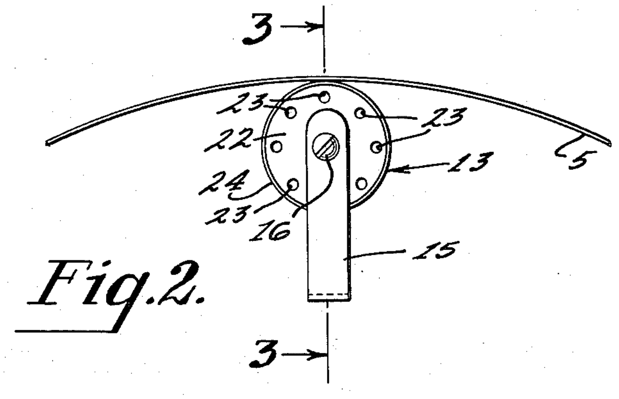
Fig. 2 is an elevational view of the automatically adjustable support.
Figure 3:
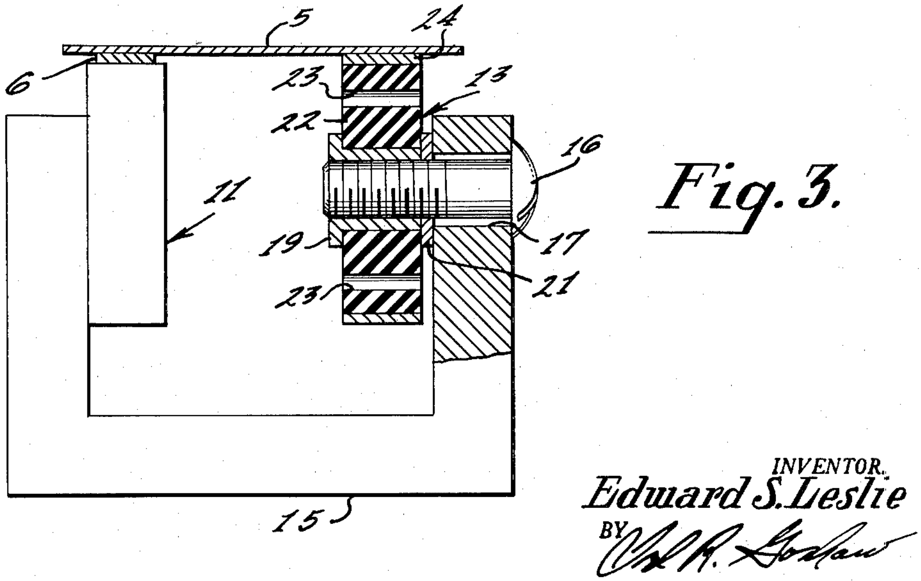
Fig. 3 is a cross-sectional view of the film, magnetic head and adjustable support taken along the line 3—3 of Fig. 2.

Referring now to Figs. 2 and 3, a U bracket 15 has the head 11 mounted on one leg thereof in any suitable manner while the other leg of the bracket has the automatically adjusting unit 13 mounted thereon by a screw 16 in an elongated hole 17, which permits of the proper initial adjustment. The unit 13 has an interiorly threaded collar or hub 19, a washer 21 being provided between unit 13 and the mounting leg of the bracket 15. The unit 13 is composed of a resilient rubber core 22 through which and parallel with the axis thereof are a number of holes 23 to obtain the desired resiliency. A stainless steel tire 24 encases the rubber core 22.

The magnetic head 11 may be of any of the ring types, one such head being shown in Rettinger U.S. Patent No. 2,628,286 of February 10, 1953. The magnetic stripe 6 is shown between the film 5 and the head 11, while the surface of the film base 5 is shown resting directly on the tire 24. Since the base of the film does not wear the tire to the same extent as the stripe 6 wears the pole pieces of the head 11, the rubber core 22 will respond to any increased pressure caused by such wear on the pole pieces produced by the pulling of the film 5 over the head 11 and support 13 as shown in Fig. 2 so that the surface of the stripe 6 will always maintain a uniform contact with the pole pieces and gap of the head 11.

The adjustable unit 13 is made circular so that different portions of the surface may be moved into contact with the film after any particular portion thereof has been worn to any extent. This is particularly necessary for film with magnetic stripes on both edges of the film, since the balancing stripe is generally much narrower than the sound stripe 6 and will wear a groove in the tire 24. In such instances, it is only necessary to rotate the unit 13 slightly to present a new surface of the tire to the film. In actual use, it has been found that the unit 13 will maintain the film stripe contact uniform for any amount of wear which can be tolerated by the head 11.

I claim:

1. A system for maintaining a uniform contact between the surface of a magnetic film record medium and the pole pieces of a magnetic head as said medium slides over said head comprising a magnetic head having pole pieces adapted to contact a certain longitudinal portion of the surface of said film record medium, said pole pieces being subject to wear as said medium slides thereover, and a unit fixed with respect to said head and adapted to contact another longitudinal portion of the surface of said film record medium and in substantially the same position transversely of said record medium as the contact position of said head, said unit including resilient means to permit the surface of said medium in contact with said unit to move with the surface of said medium in contact with said head substantially perpendicular to the surface of said record medium as said pole pieces are worn by said medium.

2. A system for maintaining a uniform contact between the surface of a magnetic record stripe on and near one edge of a film base and the pole pieces of a magnetic head as said film is pulled thereover comprising a magnetic head having pole pieces over which and in contact with which said magnetic stripe is slidable, said pole pieces being subject to wear as said film is pulled thereover, and a unit fixed with respect to said magnetic head for supporting said film base near the other edge thereof, said unit including resilient means to respond to any pressure thereon by said film base caused by any change in position of the original plane of said film on said head and unit produced by the wear of said pole pieces by said stripe, the position of contact between said magnetic head and said stripe and the position of contact between said unit and said film base being substantially the same longitudinally of said film.

3. A system in accordance with claim 1, in which said resilient means is a rubber core and said unit includes a central collar within, and a metal tire around said core.

4. A system in accordance with claim 3, in which said rubber core has holes therethrough parallel with the axis thereof to provide a predetermined resiliency.

5. A system in accordance with claim 2, in which said resilient means is a cylindrical rubber core and said unit includes a circular hub within, and a metal tire around said core, means being provided for adjusting the pressure between said tire and said film.

6. A system in accordance with claim 5, in which holes parallel with the axis of said rubber core are provided in said core.

References Cited in the file of this patent

UNITED STATES PATENTS

| | | |
|---|---|---|
| 1,849,809 | Showers | Mar. 15, 1932 |
| 2,337,832 | Moul et al. | Dec. 28, 1943 |
| 2,374,194 | Grupe | Apr. 24, 1945 |
| 2,624,574 | Camras | Jan. 6, 1953 |

FOREIGN PATENTS

| | | |
|---|---|---|
| 662,124 | Great Britain | Nov. 28, 1951 |